INVENTOR.
HEINRICH DENZLER-VON MATT

March 16, 1971 H. DENZLER VON MATT 3,570,107
METHOD FOR INJECTION MOLDING AN INFANT'S FEEDING BOTTLE
Filed Nov. 14, 1968 2 Sheets-Sheet 2

INVENTOR.
HEINRICH DENZLER-VON MATT
BY

United States Patent Office 3,570,107
Patented Mar. 16, 1971

3,570,107
METHOD FOR INJECTION MOLDING AN
INFANT'S FEEDING BOTTLE
Heinrich Denzler von Matt, 81 Stalli Konerstrasse,
Birmensdorf, Zurich, Switzerland
Filed Nov. 14, 1968, Ser. No. 775,753
Claims priority, application Switzerland, May 20, 1968,
7,436/68
Int. Cl. B29d 3/00, 23/02, 23/20
U.S. Cl. 29—436
6 Claims

ABSTRACT OF THE DISCLOSURE

An infant's feeding bottle having an internal bottle wall of cylindrical shape for receiving a slideable follow-up piston is made by injection molding in a split mold having outer mold parts movable relative to an internal core. After injection of the plastic, the outer mold parts are shifted from the bottle body and the core is moved axially downward through an open bottom end of the bottle body. The upper larger diameter portion of the core acts to expand and calibrate the lower, soft and plastic condition, tapering bottle body to a truer cylindrical shape. During removal of the core, the upper portion of the bottle around the core is cooled by a fluid. A follow-up piston of thermoplastic material is molded and then stored for a prolonged period of time in a hollow cylinder to permit shrinkage from an oversized diameter to that desired for providing sealing contact with the cylindrical body wall.

---

Figure 1:
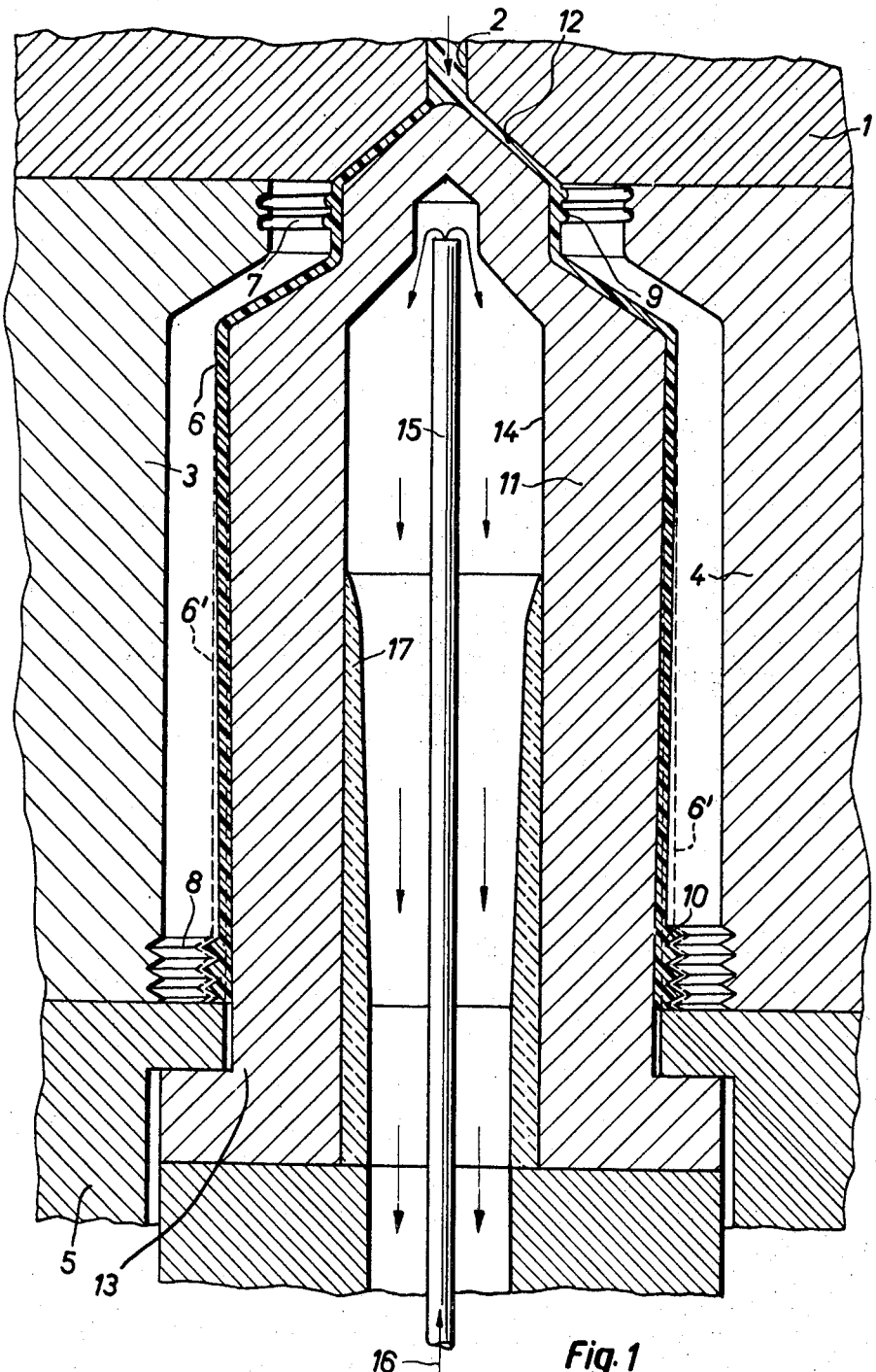

The invention relates to a method of producing an infant's feeding bottle having a follow-up piston, and apparatus for producing a feeding bottle having a follow-up piston.

Feeding bottles for infants are known having a bottom which is formed as a movable piston which, when a vacuum forms in the bottle due to suction, slides upwardly toward the nipple with the reduction in volume of liquid present in the bottle. This avoids nipple collapse and prevents sucking of air. Also, the movable bottom permits inspection to ascertain whether the infant is drinking and how much of the bottle contents have been consumed.

When producing such feeding bottles difficulties are encountered in achieving low production cost. The body of the bottle usually consists of transparent thermoplastic synthetic materials which is injected in plastic condition into a hollow mold and let to cool therein. The mold used consists of several parts in order to be able to take the molded body out of the mold. For this operation it is important that the core of the mold which forms the hollow space of the bottle, must have a small taper in order to permit its withdrawal from the hollow body after cooling thereof. The core therefore is slightly conical with its diameter increasing towards the bottom of the bottle. Because of the differences in diameter of the bottle near the neck portion and the bottom portion, the piston will slide more easily in the lower than in the upper portion. With the progressive emptying of the bottle, the advance of the piston requires more time or an increase in vacuum. The infant accordingly must slow down its rhythm of sucking or must suck more vigorously. This drawback can be avoided when the internal wall of the bottle is made exactly cylindrical, but this is not possible with the usual production methods of the bottles as outlined above.

A further inconvenience of the hitherto known infant's bottles having a follow-up piston is caused by the shrinking of the plastic material used for the piston. The piston may be made with materials sold under the trade names "Rilsan," "nylon" or other thermoplastic materials having similar properties. The shrinking which will occur a certain time after finishing causes a reduction of the sealing engagement force with which the usual sealing lip of the piston is applied against the internal surface of the bottle. This can cause the loss of sealing action particularly in the lower portion of the bottle. The lower cylindrical shank portion of the piston assures the guiding of the piston in the cylindrical part of the bottle. On the other hand, if the follow-up piston is made quite tight in its initial fit, it will have a large resistance to sliding and will result in the inconveniences mentioned above.

According to a further feature of the invention said follow-up piston is produced from thermoplastic material and is provided with guiding elements and sealing elements formed thereon and adapted to coact with the internal surface of the bottle body, said guiding and sealing elements being initially formed with a substantial oversize diameter with respect to the internal diameter of said calibrated bottle body, the piston with its guiding and sealing elements is then introduced into a hollow cylinder having a diameter of the same size as said calibrated bottle body so as to impart a bias to said guiding and sealing elements, and maintained in said cylinder for a prolonged period of time with said guiding and sealing elements under bias, before the piston is removed from the cylinder and inserted into its working position in the bottle body.

A general object of the invention is to provide a method and apparatus for producing improved infant feeding bottles.

Figure 4:
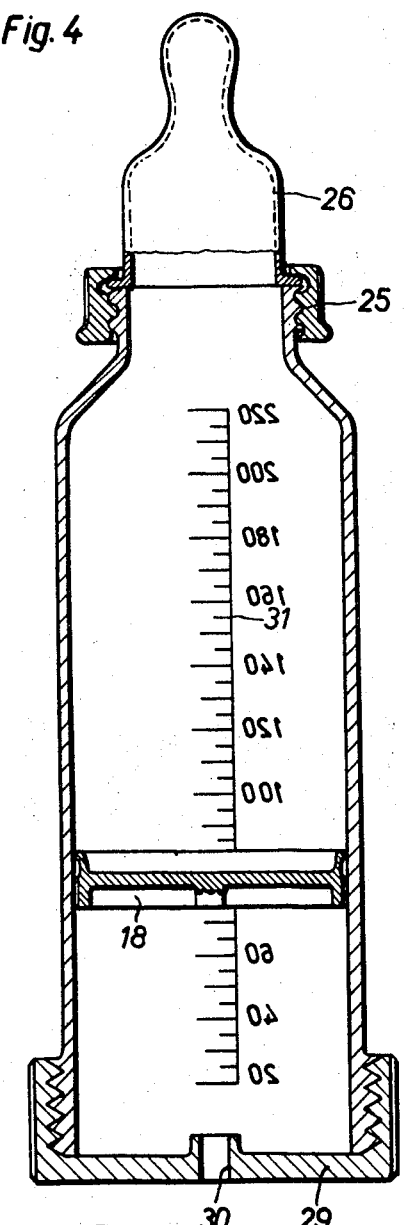
Figure 5:
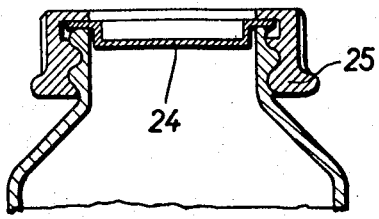
Figure 6:
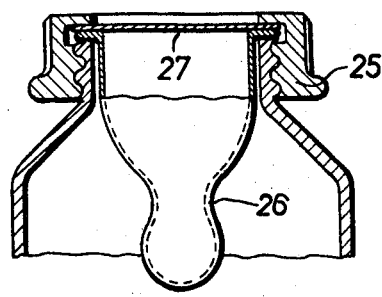
Figure 2:
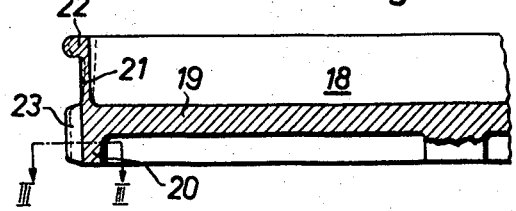
Figure 3:
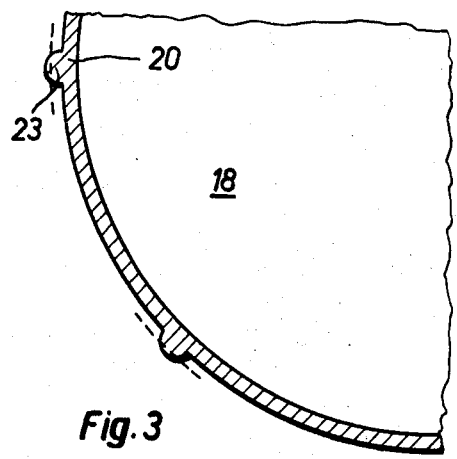
Figure 7:
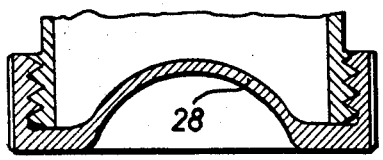

The invention will now be more fully described with reference to the accompanying drawings in which, FIG. 1 is a longitudinal section through a molding device for carrying out the method according to the invention, FIG. 2 is a radial section through a follow-up piston made according to the method of the invention, FIG. 3 is a transverse section taken along the line III—III of FIG. 2, FIG. 4 is a longitudinal section through an infant's feeding bottle made according to the method of the invention, FIGS. 5, 6 and 7 show sectional views of detail parts of a bottle according to the invention, FIG. 1 shows an injection mold for molding thermoplastic materials, the mold having an injection head 1 provided with an injection opening 2, and two outer mold halves 3 and 4 of the internal surfaces of which define the outer shape of the body of the bottle to be molded. The upper faces of the two mold halves bear against the injection head 1 and the lower faces against a base plate 5. The two halves 3 and 4 can slide in opposite direction out of their working position, whereby after having molded a bottle body 6 they can be separated from the outer surface of the body. In FIG. 1 the two mold halves are shown in a position separated from the outer surface of the molded bottle body 6. The mold halves are provided with internal thread portions 7 and 8 for forming the external threads 9 on the bottle neck and 10 at the bottom of the hollow bottle body. The separating surfaces of the two mold halves extend at right angles to the plane of the drawing and the line of separation is covered by the core of the mold.

The core 11 of the injection mold defines the internal surface of the body 6 of the bottle as shown in full lines in FIG. 1, immediately after molding. The core and the contacting hollow bottle body 6 have a contacting surface which has its largest diameter at the beginning of the neck portion of the bottle and which tapers slightly inwardly towards the bottom of the bottle. In order to obtain a precisely calibrated cylindrical internal bottle surface as running surface for the piston, the core 11, after molding, is pulled downwardly in axial direction and out of the molded bottle body 6. During such downward movement, the upper end of the core 11 which has the largest diameter, acts to expand and calibrate the bottle body 6 to a true cylindrical surface over its entire length. While the core 11 is pulled out, the bottle body 6 is held at its upper end by the gate 12 which is still connected to the neck of the molded bottle, and the bottom end of the body 6 is supported along the edge of an opening 13 in the base plate 5. The diameter of this opening permits the core to be pulled through it, and is accordingly of a slightly larger diameter than the maximum diameter of the core 11 at its upper end. In FIG. 6 the cylindrical surface 6' of the molded bottle body after expansion and calibration is shown in dotted lines.

The external surface of the core 11 is hard-chromium plated and high lustre polished in order to render the core highly wear resistant and to obtain an excellent surface finish for the sliding surface of the piston. The internal surfaces of the mold halves 3 and 4 are also highly polished and, if desired, may be hard-chromium plated.

In order to obtain a satisfactory bottle by the described calibration procedure, the cylindrical portion of the bottle body is soft and plastic at the location of deformation, otherwise the portion of the bottle cylinder already released from contact with the core would be deformed by tension owing to the frictional resistance of the core being pulled along the internal surface of the bottle body, and the portion of the cylindrical wall of the bottle situated further downwardly and still adhering to the core would be correspondingly upset. In order to avoid any such deformation of the molded bottle body when pulling the core out of the body, the portion of the hollow bottle body around that portion of the core 11 having the largest diameter is cooled. To effect such cooling the core 11 is provided with an internal axial bore 14. A tube 15 coaxially extends into the bore and opens in proximity of the upper closed end of the bore 14. A cooling fluid, preferably water of a temperature of about 90° C., is caused to enter the tube 15 in the direction of the arrow 16. This water which is discharged from the tube 14 at its upper end effects cooling of the upper portion of the core 11, particularly of the portion above the largest diameter of the core making contact with the wall of the molded bottle body. The water discharged from the top end of the tube 15 flows downwardly through the bore 14 and out of the core. In order that the lower portion of the core 11, is not unduly cooled, a sleeve 17 of heat insulating material is inserted into the bore 14 and forms a protective lining of the lower portion of the core 11. The wall thickness of the sleeve 17 increases towards the bottom of the sleeve according to the required temperature gradient. The portion of the core situated in the zone of the smaller wall thickness of the sleeve 17 is cooled more quickly than the lower portion of the core in the zone of the thicker portion of the insulating sleeve.

In principle, it is also possible to effect cooling of the portion of the molded body of the bottle already expanded and calibrated from its outside instead of from the inside as described. For this purpose a nozzle ring can be arranged to surround the cylindrical outer surface of the molded bottle at a certain distance therefrom and to blow a cooling medium, such as air, through a plurality of nozzles towards the bottle surface. This nozzle ring is pulled downwardly synchronously with the core 11 when removing the core from the molded bottle, in order to cool the already calibrated portion of the bottle surface. In his case, the two mold halves 3 and 4 would have to be removed further away from the bottle after molding than shown in FIG. 1, in order to be able to place the nozzle ring around the molded bottle, and the nozzle ring would have to be split in order to introduce it from the side over the molded body. Internal cooling of the core as shown in FIG. 1, will be more practical.

The conicity of the core 11 and of the hollow body after molding is very small and has been shown exaggerated in FIG. 1 for purposes of illustration. Therefore, only a small deformation of the molded bottle body and small forces for calibration of the conical body to a true cylindrical body are required.

For molding the body of the bottle a material known by the trade name "Makrolon" or a like polycarbonate may be used.

A brief example of the method using the illustrated apparatus will be given as an aid to understanding the invention. In operation, the core 11 is inserted into the injection mold into the position illustrated in FIG. 1 and the mold halves 3 and 4 are moved inwardly toward the core from the illustrated position of FIG. 1 to position spaced from the core by the thickness of the plastic bottle wall to be formed. A plastic material such as a polycarbonate is injected through an upper injection opening 2 under pressure to flow down along the top conical surface of the core and beneath the injection head 1 and into the surrounding space between the mold halves 3, 4 and the core 11. The plastic material flows downwardly within this space to abut the base plate 5 and thereby form an open, bottom end for the bottle body. The threads 9 and 10 are formed along with the bottle wall as is the upper gate portion 12 at the top of the bottle which will be subsequently removed from the bottle body.

The mold halves 3 and 4 are then shifted laterally away from the bottle body and water at 90° C. is injected through a tube 15 in the center of the core to cool and to make rigid the upper larger diameter portion of the core. A temperature gradient is established in a downward direction along the wall of the bottle as the lower interior portion of the wall is coated by a heat insulating sleeve 17 of increasing thickness in the downward direction. Thus, the upper larger diameter portion of the bottle wall will be solidified while the lower portion is soft and plastic as the core 11 is pulled axially downward and its upper larger diameter portion expands and calibrates the lower portion of the bottle wall to a more exact and true cylindrical shape. The bottle body remains supported by the gate 12 until the core 11 is removed.

FIGS. 2 and 3 show a follow-up piston 18 for use with the bottle obtained by the described method. This piston can be made from a polyamide, for example from a material known by the trade name "Rilsan." The piston comprises a disk 19 having a downwardly directed marginal guide flange 20 and an upwardly directed resilient marginal sleeve 21 formed with a sealing bead 22. The outer circumference of the guide flange 20 is provided with a plurality of angularly uniformly spaced guide ribs 23 extending parallel with the piston axis. These ribs have the purpose of reducing the frictional resistance of the piston when moving within the bottle, since guiding contact occurs only along narrow strips and not along the entire circumference of the piston.

As mentioned before, the original biasing and sealing force between the bottle and the wall and a conventional piston 18 will weaken after use owing to shrinking of the material, and such shrinking may result in leaking pistons. This inconvenience may be overcome with the illustrated piston 18. The sealing bead 22 is originally made with oversize dimensions. Then the piston is stored for a certain time, for example during several weeks, within a cylinder having the same internal diameter as the internal diameter of the bottle to which the piston is destined. In this cylinder, the piston is under a certain bias corresponding to the mentioned oversize of the sealing bead and guide ribs, which bias, however, is diminishing after a certain period by creeping of the material, resulting in a permanent deformation therefor. The remaining bias then is of a size as to render the piston useful for the bottle to which it is destined.

As the rim of the follow-up piston is flexed inwardly, a shrinkage or wear of the outer surface of the piston is compensated for by the rim flexing outwardly to take up and maintain sealing engagement with the bottle wall. In FIGS. 2 and 3, the contours of the sealing bead 22 and of the guide ribs 23 is biased condition are shown in dotted lines.

FIG. 4 shows the finished feeding bottle made according to the described method. The external appearance is quite similar to other bottles having a follow-up piston, but the difference with respect to other bottles of this type resides in the improved manner of operation of the piston owing to the new method of producing the bottle.

FIG. 5 illustrates a cover plate 24 held on the top edge of the bottle by a screw cap 25. When a filled bottle is closed by these two members 24 and 25, it can be transported in any desired position. The teat 26, mounted on the bottle according to FIG. 4, will be separately wrapped when the filled bottle is closed according to FIG. 5. When the bottle is empty, particularly when it is stored for sale, the teat will be lodged in the interior of the bottle. According to FIG. 6, the teat can be placed in reversed position on the top edge of the bottle and clamped by means of the screw cap 25. A disk 27 is clamped together with the teat and provides for a hygienic closure of the teat.

FIG. 7 shows a closed bottom 28 which replaces the usual open bottom 29 provided with an air hole 30, in case the bottle provided with a graduation shall be used as a measuring vessel. The volume of the bottom cover bulged inwardly then compensates the volume of the piston removed from the bottle.

What is claimed is:

1. A method of producing an infant's feeding bottle body having an internal bottle wall of cylindrical shape for receiving and cooperating with a follow-up piston, in an injection mold having outer movable mold parts and a movable, inner, downwardly tapering, core, said method comprising the steps of positioning outer mold parts adjacent said core, molding said bottle body with an open bottom and with a downwardly tapering internal bottle wall whose internal diameter decreases from the top towards the open bottom of the body, moving said outer mold parts out of contact with the external surface of said bottle body, axially removing said core from the molded bottle body through the open bottom thereof to expand and calibrate the molded bottle body to true cylindrical shape by the portion of said core having the largest diameter, and cooling the portion of the molded bottle body situated around said portion of the core having the largest diameter during removal of said core from the body.

2. A method of producing an infant's feeding bottle according to claim 1 and comprising the further steps of producing said follow-up piston from a thermoplastic material, said piston having guiding elements and sealing elements formed thereon and adapted to coact with the internal surface of the bottle body, said guiding and sealing elements being initially formed with a substantial oversize diameter with respect to the internal diameter of said calibrated bottle body, introducing said piston into a hollow cylinder having a diameter of the same size as the diameter of said calibrated bottle body so as to impart a bias to said guiding and sealing elements of the piston, maintaining said piston within said cylinder during a prolonged period of time with said guiding and sealing elements under bias, and then removing said piston from said cylinder and introducing it into said bottle body.

3. A method as claimed in claim 1, in which cooling of the molded bottle body is effected from the internal cavity of the bottle body.

4. A method as claimed in claim 1, in which cooling of the molded bottle body is effected from the outside of the cylindrical surface of the bottle body.

5. A method as claimed in claim 1, in which cooling of said bottle body is effected by introducing water at a temperature of substantially 90° C. into the upper region of said core and discharging said water in countercurrent from the core.

6. A method as claimed in claim 1, in which cooling of the molded bottle body is effected by blowing a cooling gas from a nozzle ring surrounding said bottle body towards the outer surface portion of said bottle body situated above said core, and axially moving said nozzle ring downwardly together with said core towards the bottom of said bottle body.

References Cited

UNITED STATES PATENTS

| 3,064,310 | 11/1962 | Cooprider | 264—336X |
| 3,066,353 | 12/1962 | Marks | 18—20 |
| 3,186,600 | 6/1965 | Guignard | 264—328X |
| 3,270,117 | 8/1966 | Hobson | 264—320 |
| 3,310,621 | 3/1967 | Valyi | 264—328X |

ROBERT F. WHITE, Primary Examiner

R. R. KUCIA, Assistant Examiner

U.S. Cl. X.R.

264—294, 323, 327, 328